United States Patent
Koo et al.

(10) Patent No.: US 9,042,545 B2
(45) Date of Patent: May 26, 2015

(54) APPARATUS AND METHOD FOR CONVERTING RANDOM BINARY SEQUENCE INTO RANDOM INTEGER

(71) Applicant: ELECTRONICS AND TELECOMMUNICATIONS RESEARCH INSTITUTE, Daejeon (KR)

(72) Inventors: Bonwook Koo, Daejeon (KR); Dongyoung Roh, Daejeon (KR); Daesung Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/085,076

(22) Filed: Nov. 20, 2013

(65) Prior Publication Data
US 2014/0321645 A1 Oct. 30, 2014

(30) Foreign Application Priority Data
Apr. 29, 2013 (KR) .......... 10-2013-0047487

(51) Int. Cl.
H04L 9/00 (2006.01)
H04L 9/08 (2006.01)

(52) U.S. Cl.
CPC ............ H04L 9/0869 (2013.01); H04L 9/0838 (2013.01)

(58) Field of Classification Search
CPC .................... H04L 9/0838; H04L 9/0869
USPC .................... 380/46, 262; 708/254
See application file for complete search history.

(56) References Cited

U.S. PATENT DOCUMENTS

| | | | | |
|---|---|---|---|---|
| 5,283,831 | A * | 2/1994 | Cook et al. ................. | 380/268 |
| 5,778,069 | A * | 7/1998 | Thomlinson et al. ......... | 380/262 |
| 2004/0162864 | A1* | 8/2004 | Nowshadi et al. ........... | 708/254 |
| 2007/0067375 | A1 | 3/2007 | Inaoka et al. | |
| 2010/0070549 | A1* | 3/2010 | Nagaraj ....................... | 708/254 |
| 2014/0056333 | A1* | 2/2014 | Neff ............................ | 375/149 |

FOREIGN PATENT DOCUMENTS

| | | |
|---|---|---|
| JP | 4398904 B2 | 1/2010 |
| KR | 10-2003-0059500 A | 7/2003 |
| KR | 10-2007-0018986 A | 2/2007 |
| KR | 10-2009-0024804 A | 3/2009 |
| WO | 2007/148244 A1 | 12/2007 |

OTHER PUBLICATIONS

Elaine Barker et al., "Recommendation for Random Number Generation Using Deterministic Random Bit Generators," NIST Special Publication 800-90A, Jan. 2012.

* cited by examiner

Primary Examiner — Samson Lemma
(74) Attorney, Agent, or Firm — LRK Patent Law Firm (57) ABSTRACT

An apparatus and method for converting a random binary sequence into a random integer is provided. The present invention converts a random binary sequence into a random integer, and determines whether the corresponding random integer falls within a preset integer interval. Further, if it is determined that the random integer generated from the random binary sequence does not fall within the preset integer interval, the present invention repeatedly updates a random binary sequence until a random integer falling within the corresponding integer interval is obtained, thus outputting uniformly distributed random integers which fall within the preset integer interval.

19 Claims, 4 Drawing Sheets

APPARATUS AND METHOD FOR CONVERTING RANDOM BINARY SEQUENCE INTO RANDOM INTEGER

CROSS REFERENCE TO RELATED APPLICATION

This application claims the benefit of Korean Patent Application No. 10-2013-0047487 filed on Apr. 29, 2013, which is hereby incorporated by reference in its entirety into this application.

BACKGROUND OF THE INVENTION

1. Technical Field

The present invention relates generally to an apparatus and method for converting a random binary sequence into a random integer and, more particularly, to an apparatus and method for converting a random binary sequence into a random integer, which convert a random binary sequence that is generated randomly into a random integer, determine whether the corresponding random integer falls within a preset integer interval, and if it is determined that the random integer generated from the random binary sequence does not fall within the preset integer interval, repeatedly update a random binary sequence until a random integer falling within the corresponding integer interval is obtained, thus outputting uniformly distributed random integers which fall within the preset integer interval.

2. Description of the Related Art

Generally, a random number generator is a means for generating a random binary sequence or a random integer sequence using a given initial value, and may selectively use various deterministic algorithms depending on the purpose thereof. Since a random number generator for outputting a random binary sequence is mainly configured based on private key encryption technology using a block cipher, a hash function, or the like, it has excellent efficiency. However, since a random number generator for outputting a random integer sequence is configured using mathematical operations on integers, efficiency is not excellent. Therefore, when random numbers required by encryption-based technology that use relatively large integers, such as public key encryption and signatures, are generated, a random binary sequence generated by a random number generator for outputting a binary sequence may be converted into an integer within a specific range and a random integer sequence may be generated, thus contributing to the improvement of efficiency.

For this conversion, existing methods that are known in the prior art include methods specified in the document 800-90A entitled "Recommendation for Random Number Generation Using Deterministic Random Bit Generators" (Elaine Barker and John Kelsey, 2012.1) published by National Institute of Standard and Technology (NITS). In particular, methods disclosed in the document "Recommendation for Random Number Generation Using Deterministic Random Bit Generators" include a Simple Discard Method (SDM) and a Complex Discard Method (CDM) which can guarantee randomness because the distribution of output integers conforms to a uniform distribution, but cause binary sequences that are discarded without being used, and a Simple Modular Method (SMM) and a Complex Modular Method (CMM) which utilize all given binary sequences, but the distribution of output integers does not conform to a uniform distribution and causes a skew.

SDM and CDM denote schemes for determining whether an integer representation of a given binary sequence falls within the corresponding interval, and if it is determined that the integer representation does not fall within the interval, discarding the given binary sequence, generating a new binary sequence, and re-performing determination. Further, SMM and CMM denote schemes for representing a given binary sequence by an integer and taking the remainder obtained by dividing the integer by a specific integer defined in a given interval.

SUMMARY OF THE INVENTION

Accordingly, the present invention has been made keeping in mind the above problems occurring in the prior art, and an object of the present invention is to provide a random number conversion technique, which can minimize the number of binary sequences that are discarded without being used while the distribution of integers output based on random binary sequences conforms to a uniform distribution.

In accordance with an aspect of the present invention to accomplish the above object, there is provided an apparatus for converting a random binary sequence into a random integer, including a random binary sequence generation unit configured to generate a random binary sequence $(b_0 b_1 \ldots b_{m-1})$ having m bits corresponding to a minimum number of bits required to represent r−1 by a binary number in an integer interval [0, r−1], where r is an integer greater than 1; an integer conversion unit configured to convert the random binary sequence $(b_0 b_1 \ldots b_{m-1})$ into an integer; and a random integer output unit configured to determine whether the integer converted from the random binary sequence $(b_0 b_1 \ldots b_{m-1})$ falls within the integer interval [0, r−1], and configured to, if it is determined that the integer converted from the random binary sequence $(b_0 b_1 \ldots b_{m-1})$ does not fall within the integer interval [0, r−1], request the random binary sequence generation unit to update the random binary sequence $(b_0 b_1 \ldots b_{m-1})$, and, if it is determined that the integer converted from the random binary sequence $(b_0 b_1 \ldots b_{m-1})$ falls within the integer interval [0, r−1], output the integer converted from the random binary sequence $(b_0 b_1 \ldots b_{m-1})$ as a random integer, wherein the random binary sequence generation unit generates an additional random binary sequence at an update request of the random integer output unit, and updates the random binary sequence $(b_0 b_1 \ldots b_{m-1})$ to a random binary sequence calculated by combining the generated additional random binary sequence with the random binary sequence $(b_0 b_1 \ldots b_{m-1})$.

Preferably, the random binary sequence generation unit may calculate d that is a minimum value of i satisfying $b_i > r_i$ and generate an additional random binary sequence $(b_m b_{m+1} \ldots b_{m+d})$ having d+1 bits at the update request of the random integer output unit, and update the random binary sequence $(b_0 b_1 \ldots b_{m-1})$ to a random binary sequence $(b_{d+1} b_{d+2} \ldots b_{m+d})$ calculated based on the random binary sequence $(b_0 b_1 \ldots b_{m-1})$ and the additional random binary sequence $(b_m b_{m+1} \ldots b_{m+d})$, where $b_i$ denotes an ith bit value of the random binary sequence $(b_0 b_1 \ldots b_{m-1})$, and $r_i$ denotes an ith bit value when r−1 is represented by a binary sequence $(b_0 b_1 \ldots b_{m-1})$ having m bits.

Preferably, the integer conversion unit may convert the random binary sequence $(b_0 b_1 \ldots b_{m-1})$ updated to the random binary sequence $(b_{d+1} b_{d+2} \ldots b_{m+d})$ into an integer, and the random integer output unit may determine whether the integer converted from the updated random binary sequence $(b_0 b_1 \ldots b_{m-1})$ falls within the integer interval [0, r−1], and if it is determined that the integer converted from the updated random binary sequence $(b_0 b_1 \ldots b_{m-1})$ falls within the integer interval [0, r−1], output the integer converted from the updated random binary sequence $(b_0 b_1 \ldots b_{m-1})$ as a random integer. In this case, the integer conversion unit may request the random binary sequence generation unit to repeatedly perform an operation of generating a new additional random binary sequence $(b_m b_{m+1} \ldots b_{m+d})$ and re-updating a random binary sequence until the integer converted from the random binary sequence updated by the random binary sequence generation unit falls within the integer interval $[0, r-1]$.

In accordance with another aspect of the present invention to accomplish the above object, there is provided an apparatus for converting a random binary sequence into a random integer sequence, including a random binary sequence generation unit configured to generate a random binary sequence $(b_0 b_1 \ldots b_{k-1})$ having k bits corresponding to a minimum number of bits required to represent $r^n-1$ by a binary number in an integer interval $[0, r^n-1]$, where r is an integer greater than 1; an integer conversion unit configured to convert the random binary sequence $(b_0 b_1 \ldots b_{k-1})$ into an integer 'a'; and a random integer sequence output unit configured to determine whether the integer 'a' converted from the random binary sequence $(b_0 b_1 \ldots b_{k-1})$ falls within the integer interval $[0, r^n-1]$, and configured to, if it is determined that the integer converted from the random binary sequence $(b_0 b_1 \ldots b_{k-1})$ does not fall within the integer interval $[0, r^n-1]$, request the random binary sequence generation unit to update the random binary sequence $(b_0 b_1 \ldots b_{k-1})$, and, if it is determined that the integer converted from the random binary sequence $(b_0 b_1 \ldots b_{k-1})$ falls within the integer interval $[0, r^n-1]$, output a random integer sequence $(a_0 a_1 \ldots a_{n-1})$ composed of n random integers $(a_0, \ldots, a_{n-1})$ calculated based on equation $a = \sum_{i=0}^{n-1} r^{n-1-i} a_i$ for the integer 'a' converted from the random binary sequence $(b_0 b_1 \ldots b_{k-1})$, wherein the random binary sequence generation unit generates an additional random binary sequence at an update request of the random integer sequence output unit, and updates the random binary sequence $(b_0 b_1 \ldots b_{k-1})$ to a random binary sequence calculated by combining the generated additional random binary sequence with the random binary sequence $(b_0 b_1 \ldots b_{k-1})$.

Preferably, the random binary sequence generation unit may calculate d that is a minimum value of i satisfying $b_i > r_i$ and generates an additional random binary sequence $(b_k b_{k+1} \ldots b_{k+d})$ having d+1 bits at the update request of the random integer sequence output unit, and updates the random binary sequence $(b_0 b_1 \ldots b_{k-1})$ to a random binary sequence $(b_{d+1} b_{d+2} \ldots b_{k+d})$ calculated based on the random binary sequence $(b_0 b_1 \ldots b_{k-1})$ and the additional random binary sequence $(b_k b_{k+1} \ldots b_{k-d})$. In this case, $b_i$ denotes an ith bit value of the random binary sequence $(b_0 b_1 \ldots b_{k-1})$ and $r_i$ denotes an ith bit value when $r^n-1$ is represented by a binary sequence $(r_0 r_1 \ldots r_{k-1})$ having k bits.

Preferably, the integer conversion unit may convert the random binary sequence $(b_0 b_1 \ldots b_{k-1})$ updated to the random binary sequence $(b_{d+1} b_{d+2} \ldots b_{k+d})$ into the integer 'a', and the random integer sequence output unit may determine whether the integer 'a' converted from the updated random binary sequence $(b_0 b_1 \ldots b_{k-1})$ falls within the integer interval $[0, r^n-1]$, and if it is determined that the integer 'a' converted from the updated random binary sequence $(b_0 b_1 \ldots b_{k-1})$ falls within the integer interval $[0, r^n-1]$, output the random integer sequence $(a_0 a_1 \ldots a_{n-1})$ composed of n random integers $(a_0, \ldots, a_{n-1})$ calculated based on equation $a = \sum_{i=0}^{n-1} r^{n-1-i} a_i$ for the integer 'a' converted from the updated random binary sequence $(b_0 b_1 \ldots b_{k-1})$. In this case, the integer conversion unit may request the random binary sequence generation unit to repeatedly perform an operation of generating a new additional random binary sequence $(b_k b_{k+1} \ldots b_{k-d})$ and re-updating a random binary sequence until the integer 'a' converted from the random binary sequence updated by the random binary sequence generation unit falls within the integer interval $[0, r^n-1]$.

In accordance with a further aspect of the present invention to accomplish the above object, there is provided a method of converting a random binary sequence into a random integer, including a) generating a random binary sequence; b) converting the random binary sequence into an integer; c) determining whether the integer converted from the random binary sequence falls within a preset integer interval; d) if it is determined that the integer converted from the random binary sequence falls within the preset integer interval, outputting a random integer calculated based on the integer converted from the random binary sequence; and e) if it is determined that the integer converted from the random binary sequence does not fall within the preset integer interval, generating an additional random binary sequence, updating the random binary sequence to a random binary sequence calculated by combining the generated additional random binary sequence with the random binary sequence, and repeatedly performing b) to d).

Preferably, a) of generating the random binary sequence may be configured to generate a random binary sequence $(b_0 b_1 \ldots b_{m-1})$ having m bits corresponding to a minimum number of bits required to represent r−1 by a binary number in an integer interval $[0, r-1]$.

Preferably, b) of converting the random binary sequence into the integer may be configured to convert the random binary sequence $(b_0 b_1 \ldots b_{m-1})$ into an integer.

Preferably, c) of determining whether the integer converted from the random binary sequence falls within the preset integer interval may be configured to determine whether the integer converted from the random binary sequence $(b_0 b_1 \ldots b_{m-1})$ falls within the integer interval $[0, r-1]$.

Preferably, d) of outputting the random integer calculated based on the integer converted from the random binary sequence may be configured to, if the integer converted from the random binary sequence $(b_0 b_1 \ldots b_{m-1})$ falls within the integer interval $[0, r-1]$, output the integer converted from the random binary sequence $(b_0 b_1 \ldots b_{m-1})$ as a random integer.

Preferably, e) of updating the random binary sequence and repeatedly performing b) to d) may be configured to, if the integer converted from the random binary sequence $(b_0 b_1 \ldots b_{m-1})$ does not fall within the integer interval $[0, r-1]$, calculate d that is a minimum value of i satisfying $b_i > r_i$, generate an additional random binary sequence $(b_m b_{m+1} \ldots b_{m+d})$ having d+1 bits, update the random binary sequence $(b_0 b_1 \ldots b_{m-1})$ to a random binary sequence $(b_{d+1} b_{d+2} \ldots b_{m+d})$ calculated based on the random binary sequence $(b_0 b_1 \ldots b_{m-1})$ and the additional random binary sequence $(b_m b_{m+1} \ldots b_{m+d})$, and repeatedly perform b) to d).

Preferably, e) of updating the random, binary sequence and repeatedly performing b) to d) may be configured to repeatedly perform b) to d) until the integer converted from the random binary sequence $(b_0 b_1 \ldots b_{m-1})$ updated to the random binary sequence $(b_{d+1} b_{d+2} \ldots b_{m+d})$ falls within the integer interval $[0, r-1]$.

In accordance with yet another aspect of the present invention to accomplish the above object, there is provided a method of converting a random binary sequence into a random integer sequence, including a) generating a random binary sequence; b) converting the random binary sequence into an integer; c) determining whether the integer converted from the random binary sequence falls within a preset integer interval; d) if it is determined that the integer converted from the random binary sequence falls within the preset integer interval, outputting a random integer sequence calculated based on the integer converted from the random binary sequence; and e) if it is determined that the integer converted from the random binary sequence does not fall within the preset integer interval, generating an additional random binary sequence, updating the random binary sequence to a random binary sequence calculated by combining the generated additional random binary sequence with the random binary sequence, and repeatedly performing b) to d).

Preferably, a) of generating the random binary sequence may be configured to generate a random binary sequence $(b_0 b_1 \ldots b_{k-1})$ having k bits corresponding to a minimum number of bits required to represent $r^n-1$ by a binary number in an integer interval $[0, r^n-1]$, Preferably, b) of converting the random binary sequence into the integer may be configured to convert the random binary sequence $(b_0 b_1 \ldots b_{k-1})$ into an integer 'a'.

Preferably, c) of determining whether the integer converted from the random binary sequence falls within the preset integer interval may be configured to determine whether the integer 'a' converted from the random binary sequence $(b_0 b_1 \ldots b_{k-1})$ falls within the integer interval $[0, r^n-1]$.

Preferably, d) of outputting the random integer sequence calculated based on the integer converted from the random binary sequence may be configured to, if the integer 'a' converted from the random binary sequence $(b_0 b_1 \ldots b_{k-1})$ falls within the integer interval $[0, r^n-1]$, output a random integer sequence $(a_0 a_1 \ldots a_{n-1})$ composed of n random integers $(a_0, a_1, \ldots, a_{n-1})$ calculated based on equation $a = \Sigma_{i=0}^{n-1} r^{n-1-i} a_i$ for the integer 'a' converted from the random binary sequence $(b_0 b_1 \ldots b_{k-1})$.

Preferably, e) of updating the random binary sequence and repeatedly performing b) to d) may be configured to, if it is determined that the integer converted from the random binary sequence $(b_0 b_1 \ldots b_{k-1})$ does not fall within the integer interval $[0, r^n-1]$, calculate d that is a minimum value of i satisfying $b_i > r_i$, generate an additional random binary sequence $(b_k b_{k+1} \ldots b_{k+d})$ having d+1 bits, update the random binary sequence $(b_0 b_1 \ldots b_{k-1})$ to a random binary sequence $(b_{d+1} b_{d+2} \ldots b_{k+d})$ calculated based on the random binary sequence $(b_0 b_1 \ldots b_{k-1})$ and the additional random binary sequence $(b_k b_{k+1} \ldots b_{k+d})$, and repeatedly perform b) to d).

Preferably, e) of updating the random binary sequence and repeatedly performing b) to d) may be configured to, repeatedly perform b) to d) until the integer 'a' converted from the random binary sequence $(b_0 b_1 \ldots b_{k-1})$ updated to the random binary sequence $(b_{d+1} b_{d+2} \ldots b_{k+d})$ falls within the integer interval $[0, r^n-1]$.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. In the following description, redundant descriptions and detailed descriptions of known functions and elements that may unnecessarily make the gist of the present invention obscure will be omitted. Embodiments of the present invention are provided to fully describe the present invention to those having ordinary knowledge in the art to which the present invention pertains. Accordingly, in the drawings, the shapes, and sizes of elements may be exaggerated for the sake of clearer description.

A technique for converting a random binary sequence into a random integer or a random integer sequence according to the present invention is configured to convert a random binary sequence, which is randomly selected, into a single random integer or a random integer sequence composed of a plurality of random integers. In particular, in the present invention, a technique for converting a random binary sequence, which is randomly selected, into a single random integer is defined by a Simple Partial Discard Method (SPDM). A technique for converting a random binary sequence, which is randomly selected, into a random integer sequence composed of a plurality of random integers is defined by a Complex Partial Discard Method (CPDM). Meanwhile, depending on the SPDM or CPDM of the present invention, when a single random integer falling within a range set as a closed interval $[\alpha, \beta]$ or a random integer sequence composed of a plurality of random integers falling within, the range is output, a scheme for defining the value of $\beta - \alpha$ as r-1, calculating a single integer (t; where $0 \leq t \leq r \times 1$) falling within the range of a closed interval $[0, r-1]$ (where r is an integer greater than 1) or a plurality of integers $(a_0, \ldots, a_{n-1}$; where $0 \leq a_0, \ldots, a_{n-1} \leq r-1)$, adding $\alpha$ to the single integer 't' or the plurality of integers $a_0, \ldots, a_{n-1}$, and outputting a resulting value may be used.

Hereinafter, the configuration and operation of an apparatus for converting a random binary sequence into a random integer according to the present invention will be described in detail with reference to FIGS. 1 and 2.

Figure 1:
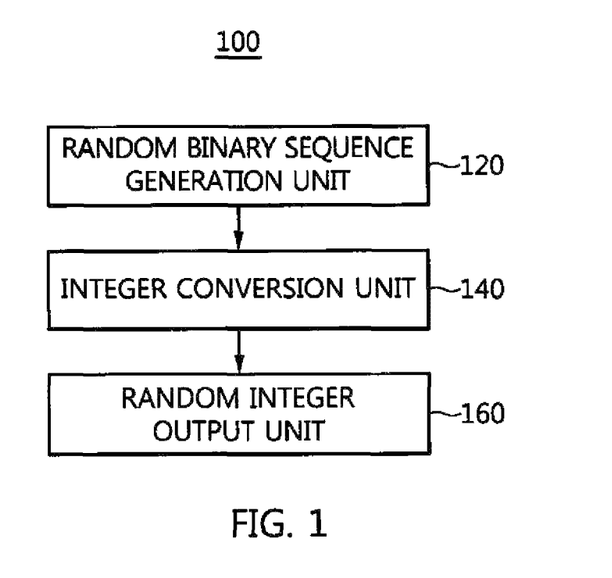
FIG. 1 is a block diagram showing the configuration of an apparatus for converting a random binary sequence into a random integer according to an embodiment of the present invention, wherein the apparatus outputs a random integer depending on a Simple Partial Discard Method (SPDM)

FIG. 1 is a block diagram showing the configuration of an apparatus for converting a random binary sequence into a random integer according to an embodiment of the present invention, wherein the apparatus outputs a random integer depending on a Simple Partial Discard Method (SPDM) for converting a random binary sequence into a single random integer.

Referring to FIG. 1, an apparatus 100 for converting a random binary sequence into a random integer depending on the SPDM in accordance with the present invention includes a random binary sequence generation unit 120, an integer conversion unit 140, and a random integer output unit 160.

The random binary sequence generation unit 120 generates a random binary sequence and transfers the initially generated random binary sequence to the integer conversion unit 140. In this case, in order for the random integer output unit 160 to output a random integer falling within an integer interval [0, r−1], the random binary sequence generation unit 120 generates a random binary sequence $b_0 b_1 \ldots b_{m-1}$ having m bits corresponding to the minimum number of bits required to represent r−1 by a binary number and transfers the random binary sequence to the integer conversion unit 140. The number of bits m of the random binary sequence (binary bit sequence) $b_0 b_1 \ldots b_{m-1}$ generated by the random binary sequence generation unit 120 may be generated by the following Equation (1):

$$m = <\log_2(r)> \quad (1)$$

where mathematical sign <x> denotes an operation symbol indicative of a minimum integer equal to or greater than x.

Meanwhile, in the integer interval set as the range of [0, r−1], r−1 may be represented by the following Equation (2):

$$r-1 = \sum_{i=0}^{m-1} 2^{m-1-i} r_i = 2^{m-1} r_0 + 2^{m-2} r_1 + K + 2^1 r_{m-2} + 2^0 r_{m-1} \quad (2)$$

where $r_i \in \{0, 1\}$, i=0, 1, 2, 3, K, m−1

Further, the random binary sequence generation unit 120 generates a random binary sequence $b_m b_{m+1} \ldots b_{m+d}$ having d+1 bits as an additional random binary sequence at the request of the random integer output unit 160, calculates a random binary sequence $b_{d+1} b_{d+2} \ldots b_{m+d}$ based on the bits of the random binary sequence $b_0 b_1 \ldots b_{m-1}$ and the bits of the additional random binary sequence $b_m b_{m+1} \ldots b_{m+d}$, and updates the random binary sequence $b_0 b_1 \ldots b_{m-1}$ to the calculated random binary sequence $b_{d+1} b_{d+2} \ldots b_{m+d}$. In greater detail, the random binary sequence generation unit 120 is configured to, if a request to generate an additional random binary sequence having d+1 bits is received from the random integer output unit 160, generate the additional random binary sequence $b_m b_{m+1} \ldots b_{m+d}$ having d+1 bits, and update the existing random binary sequence $b_0 b_1 \ldots b_{m-1}$ to $b_{d+1} b_{d+2} \ldots b_{m+d}$ obtained by combining the additional random binary sequence $b_m b_{m+1} \ldots b_{m+d}$ with the existing random binary sequence $b_0 b_1 \ldots b_{m-1}$. Accordingly, the random binary sequence transferred from the random binary sequence generation unit 120 to the integer conversion unit 140 corresponds to the random binary sequence $b_0 b_1 \ldots b_{m-1}$, the respective bit values of which are sequentially replaced with the bit values of the sequence $b_{d+1} b_{d+2} \ldots b_{m+d}$.

The integer conversion unit 140 converts the random binary sequence received from the random binary sequence generation unit 120 into an integer, and transfers the integer to the random integer output unit 160. In this case, the integer conversion unit 140 receives the random binary sequence $b_0 b_1 \ldots b_{m-1}$ having m bits from the random binary sequence generation unit 120, and converts the received random binary sequence $b_0 b_1 \ldots b_{m-1}$ into an integer 't' based on the following Equation (3):

$$t = \sum_{i=0}^{m-1} 2^{m-1-i} b_i = 2^{m-1} b_0 + 2^{m-2} b_1 + K + 2^1 b_{m-2} + 2^0 b_{m-1} \quad (3)$$

where t denotes an integer converted from the random binary sequence $b_0 b_1 \ldots b_{m-1}$, and $b_i$ denotes an ith bit value in the random binary sequence $b_0 b_1 \ldots b_{m-1}$.

The random binary sequence $b_0 b_1 \ldots b_{m-1}$ received by the integer conversion unit 140 from the random binary sequence generation unit 120 corresponds to the random binary sequence $b_0 b_1 \ldots b_{m-1}$ that is either initially generated by the random binary sequence generation unit 120 or updated thereby based on the additional random binary sequence $b_m b_{m+1} b_{m+d}$.

The random integer output unit 160 receives the integer converted from the random binary sequence from the integer conversion unit 140, determines whether the integer converted from the random binary sequence falls within a preset integer interval, and outputs the corresponding integer as a random integer if it is determined that the integer falls within the preset integer interval. In greater detail, the random integer output unit 160 receives the integer t' converted from the random binary sequence $b_0 b_1 \ldots b_{m-1}$, generated or updated by the random binary sequence generation unit 120, from the integer conversion unit 140, and determines whether the received integer 't' falls within an integer interval [0, r−1]. If it is determined that the received integer 't' falls within the integer interval [0, r−1] (when 0≤t≤r−1), the random integer output unit 160 outputs the integer 't' as a random integer. In this case, the random integer output unit 160 may add α to the integer 't' falling within the integer interval [0, r−1], and output a resulting value.

In contrast, if it is determined that the received integer 't' does not fall within the integer interval [0, r−1] (when t>r−1), the random integer output unit 160 calculates d corresponding to the minimum value of i satisfying $b_i > r_i$. In this case, the random integer output unit 160 calculates d satisfying the following Equation 4:

$$2^{m-d-1} \leq T \oplus R < 2^{m-d} \quad (4)$$

where T and R denote values obtained by representing the integers t and r−1 by binary numbers having the same number of bits, and ⊕ denotes a symbol indicative of an eXclusive OR (XOR) operation.

When the random integer output unit 160 calculates d because the received integer 't' does not fall within the integer interval [0, r−1], it requests the random binary sequence generation unit 120 to generate the additional random binary sequence $b_m b_{m+1} \ldots b_{m+d}$ having d+1 bits and to update the random binary sequence $b_0 b_1 \ldots b_{m-1}$.

The apparatus 100 for converting a random binary sequence into a random integer depending on the SPDM in accordance with the present invention repeatedly performs the operation of updating the random binary sequence $b_0 b_1 \ldots b_{m-1}$ and the operation of converting the updated random binary sequence $b_0 b_1 \ldots b_{m-1}$ into an integer until the integer 't' output from the integer conversion unit 140 falls within the integer interval [0, r−1].

Figure 2:
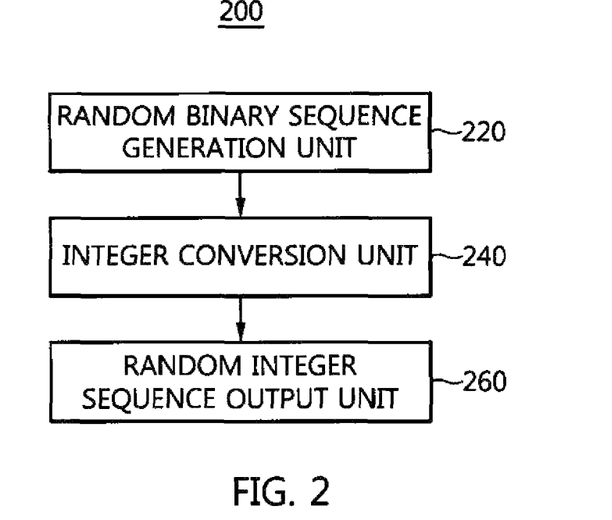
FIG. 2 is a block diagram showing the configuration of an apparatus for converting a random binary sequence into a random integer sequence according to another embodiment of the present invention, wherein the apparatus outputs a random integer sequence depending on a Complex PDM (CPDM)

FIG. 2 is a block diagram showing the configuration of an apparatus for converting a random, binary sequence into a random integer sequence according to another embodiment of the present invention, wherein the apparatus outputs a random integer sequence depending on a Complex PDM (CPDM) for converting a random binary sequence into a random integer sequence composed of a plurality of random integers.

Referring to FIG. 2, an apparatus 200 for converting a random binary sequence into a random integer sequence according to the CPDM of the present invention includes a random binary sequence generation unit 220, an integer conversion unit 240, and a random integer sequence output unit 260.

The random binary sequence generation unit 220 generates a random binary sequence, and transfers the initially generated random binary sequence to the integer conversion unit 240. In this case, in order for the random integer sequence output unit 260 to output a random integer sequence composed of n random integers falling within an integer interval $[0, r''-1]$, the random binary sequence generation unit 220 generates a random binary sequence $b_0 b_1 \ldots b_{k-1}$ having k bits corresponding to the minimum number of bits required to represent $r''-1$ by a binary number, and transfers the random binary sequence $b_0 b_1 \ldots b_{k-1}$ to the integer conversion unit 240. The number of bits k of the random binary sequence (binary bit sequence) $b_0 b_1 \ldots b_{k-1}$ generated by the random binary sequence generation unit 220 may be, generated by the following Equation (5):

$$k = <\log_2(r'')> \quad (5)$$

Meanwhile, in, the integer interval set as the range of $[0, r''-1]$, $r''-1$ may be represented by the following Equation (6):

$$r''-1 = \sum_{i=0}^{k-1} 2^{k-1-i} r_i = 2^{k-1} r_0 + 2^{k-2} r_1 + K + 2^1 r_{k-2} + 2^0 r_{k-1} \quad (6)$$

where $r_i \in \{0, 1\}$, $i=0, 1, 2, 3, K, k-1$

Further, the random binary sequence generation unit 220 generates a random binary sequence $b_k b_{k+1} \ldots b_{k+d}$ having d+1 bits as an additional random binary sequence at the request of the random integer sequence output unit 260, calculates a random binary sequence $b_{d+1} b_{d+2} \ldots b_{k+d}$ based on the bits of the random binary sequence $b_0 b_1 \ldots b_{k-1}$ and the bits of the additional random binary sequence $b_k b_{k+1} \ldots b_{k+d}$, and updates the random binary sequence $b_0 b_1 \ldots b_{k-1}$ to the calculated random binary sequence $b_{d+1} b_{d+2} \ldots b_{k+d}$. In greater detail, the random binary sequence generation unit 220 is configured to, when a request to generate an additional random binary sequence having d+1 bits is received from the random integer sequence output unit 260, generate an additional random binary sequence $b_k b_{k+1} \ldots b_{k+d}$ having d+1 bits, and update the existing random binary sequence $b_0 b_1 \ldots b_{k-1}$ to the sequence $b_{d+1} b_{d+2} \ldots b_{k+d}$ calculated by combining the additional random binary sequence $b_k b_{k+1} \ldots b_{k+d}$ with the existing random binary sequence $b_0 b_1 \ldots b_{k-1}$. Accordingly, the random binary sequence transferred from the random binary sequence generation unit 220 to the integer conversion unit 240 corresponds to the random binary sequence $b_0 b_1 \ldots b_{k-1}$, the respective bit values of which are, sequentially replaced with the bits of the sequence $b_{d+1} b_{d+2} \ldots b_{k+d}$.

The integer conversion unit 240 converts the random binary sequence received from the random binary sequence generation unit 220 into an integer, and transfers the integer to the random integer sequence output unit 260. In this case, the integer conversion unit 240 receives the random binary sequence $b_0 b_1 \ldots b_{k-1}$ having k bits from the random binary sequence generation unit 220, and converts the received random binary sequence $b_0 b_1 \ldots b_{k-1}$ into an integer 'a' based on the following Equation (7):

$$a = \sum_{i=0}^{k-1} 2^{k-1-i} b_i = 2^{k-1} b_0 + 2^{k-2} b_1 + K + 2^1 b_{k-2} + 2^0 b_{k-1} \quad (7)$$

where 'a' denotes an integer converted from the random binary sequence $b_0 b_1 \ldots b_{k-1}$, and $b_i$ denotes an ith bit value in the random binary sequence $b_0 b_1 \ldots b_{k-1}$.

The random binary sequence $b_0 b_1 \ldots b_{k-1}$ received by the integer conversion unit 240 from the random binary sequence generation unit 220 corresponds to the random binary sequence $b_0 b_1 \ldots b_{k-1}$ that is either initially generated by the random binary sequence generation unit 220, or updated thereby based on the additional random binary sequence $b_k b_{k+1} \ldots b_{k+d}$.

The random integer sequence output unit 260 receives the integer, converted from the random binary sequence, from the integer conversion unit 240, determines whether the integer converted from the random binary sequence falls within a preset integer interval, and if it is determined that the integer falls within the preset integer interval, outputs an integer sequence composed of integers calculated based on the corresponding integer as a random integer sequence. In greater detail, the random integer sequence output unit 260 receives the integer 'a' generated by the random binary sequence generation unit 220 or converted from the updated random binary sequence $b_0 b_1 \ldots b_{k-1}$ from the integer conversion unit 240, and determines whether the received integer 'a' falls within an integer interval $[0, r''-1]$. If it is determined that the received integer 'a' falls within the integer interval $[0, r''-1]$ (when $0 \leq a \leq r''-1$), the random integer sequence output unit 260 calculates, for the integer 'a', n integers $a_0, \ldots, a_{n-1}$ based on the following Equation (8):

$$a = \sum_{i=0}^{n-1} r^{n-1-i} a_i = r^{n-1} a_0 + r^{n-2} a_1 + K + r^1 a_{n-2} + r^0 a_{n-1} \quad (8)$$

where $a_i \in \{0, 1, K\, r-1\}$, $i=0, 1, 2, 3, K, n-1$

Further, the random integer sequence output unit 260 outputs the integer sequence $a_0 a_1 \ldots a_{n-1}$ composed of the n integers $a_0, \ldots, a_{n-1}$ calculated from the integer 'a' as a random integer sequence. In this case, the random integer sequence output unit 260 may add $\alpha$ to the individual integers of the random integer sequence $a_0 a_1 \ldots a_{n-1}$ and output a resulting value.

In contrast, if the received integer 'a' does not fall within the integer interval $[0, r''-1]$ (when $a > r''-1$), the random integer sequence output unit 260 calculates d corresponding to the minimum value of i satisfying $b_i > r_i$. In this case, the random integer sequence output unit 260 calculates d satisfying the following Equation (9):

$$2^{k-d-1} \leq A \oplus R' < 2^{k-d} \quad (9)$$

where A and R' denote values obtained by representing the integers 'a' and $r''-1$ by binary values having the same number of bits.

When the random integer sequence output unit 260 calculates d because the received integer 'a' does not fall within the integer interval $[0, r''-1]$, it requests the random binary sequence generation unit 220 to generate an additional random binary sequence $b_k b_{k+1} \ldots b_{k+d}$ having d+1 bits and to update the random binary sequence $b_0 b_1 \ldots b_{k-1}$.

The apparatus 200 for converting a random binary sequence into a random integer sequence depending on the CPDM in accordance with the present invention repeatedly performs the operation of updating the random binary sequence $b_0 b_1 \ldots b_{k-1}$ and the operation of converting the updated random binary sequence $b_0 b_1 \ldots b_{k-1}$ into an integer until the integer 'a' output from the integer conversion unit 240 falls within the integer interval $[0, r''-1]$.

Hereinafter, a method of converting a random binary sequence into a random integer according to the present invention will be described in detail with reference to FIGS. 3 to 5. Prior to the description thereof, it should be noted that the description of some overlapping components identical to the operations of the apparatus for converting a random binary sequence into a random integer depending on an SPDM, which has been described with reference to FIG. 1, and the apparatus for converting a random binary sequence into a random integer sequence depending on a CPDM, which has been described with reference to FIG. 2, will be omitted here.

Figure 3:
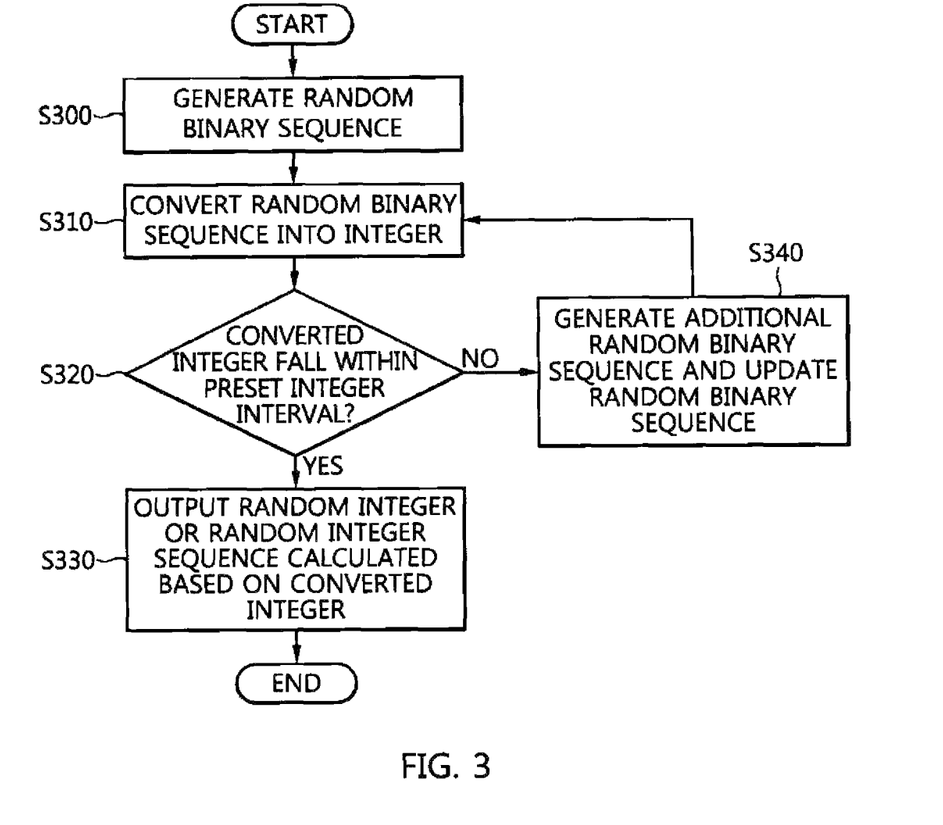
FIG. 3 is a flowchart showing a method of converting a random binary sequence into a random integer according to the present invention.

FIG. 3 is a flowchart showing a method of converting a random binary sequence into a random integer according to the present invention.

Referring to FIG. 3, in the method of converting a random binary sequence into a random integer according to the present invention, the random binary sequence generation unit 120 or 220 generates a random binary sequence $b_0 b_1 \ldots b_{m-1}$ or $b_0 b_1 \ldots b_{k-1}$ at step S300. The random binary sequence generation unit 120 or 220 transmits the generated random binary sequence $b_0 b_1 \ldots b_{m-1}$ or $b_0 b_1 \ldots b_{k-1}$ to the integer conversion unit 140 or 240.

Further, the integer conversion unit 140 or 240 converts the initial random binary sequence $b_0 b_1 \ldots b_{m-1}$ or $b_0 b_1 \ldots b_{k-1}$ generated by the random binary sequence generation unit 120 or 220 into an integer 't' or 'a' at step S310. The integer conversion unit 140 or 240 outputs the integer 't' or 'a' converted from the initial random binary sequence $b_0 b_1 \ldots b_{m-1}$ or $b_0 b_1 \ldots b_{k-1}$ to the random integer output unit 160 or the random integer sequence output unit 260.

Then, the random integer output unit 160 or the random integer sequence output unit 260 determines whether the integer 't' or 'a' converted from the initial random binary sequence $b_0 b_1 \ldots b_{m-1}$ or $b_0 b_1 \ldots b_{k-1}$ falls within a preset integer interval $[0, r-1]$ or $[0, r^n-1]$ at step S320.

If it is determined at step S320 that the integer 't' or 'a' converted from the random binary sequence $b_0 b_1 \ldots b_{m-1}$ or $b_0 b_1 \ldots b_{k-1}$ falls within the preset integer interval $[0, r-1]$ or $[0, r^n-1]$, the random integer output unit 160 outputs the integer 't' converted from the initial random binary sequence $b_0 b_1 \ldots b_{m-1}$ as a random integer, and the random integer sequence output unit 260 outputs an integer sequence $a_0 a_1 \ldots a_{n-1}$ composed of n integers $a_0, \ldots, a_{n-1}$, calculated based on Equation (8) for the integer 'a' converted from the initial random binary sequence $b_0 b_1 \ldots b_{k-1}$, as a random integer sequence at step S330.

In contrast, if it is determined at step S320 that the integer 't' or 'a' converted from the initial random binary sequence $b_0 b_1 \ldots b_{m-1}$ or $b_0 b_1 \ldots b_{k-1}$ does not fall within the integer interval $[0, r-1]$ or $[0, r^n-1]$, the random binary sequence generation unit 120 or 220 generates an additional random binary sequence $b_m b_{m+1} \ldots b_{m+d}$ or $b_k b_{k+1} \ldots b_{k+d}$ at the request of the random integer output unit 160 or the random integer sequence output unit 260, and updates the random binary sequence $b_0 b_1 \ldots b_{m-1}$ or $b_0 b_1 \ldots b_{k-1}$ at step S340. At step S340, the random binary sequence $b_0 b_1 \ldots b_{m-1}$ or $b_0 b_1 \ldots b_{k-1}$ is updated to the random binary sequence $b_{d+1} b_{d+2} \ldots b_{m+d}$ or $b_{d+1} b_{d+2} \ldots b_{k+d}$ which is calculated by the random binary sequence generation unit 120 or 220 by combining the existing random binary sequence $b_0 b_1 \ldots b_{m-1}$ or $b_0 b_1 \ldots b_{k-1}$ with the additional random binary sequence $b_m b_{m+1} \ldots b_{m+d}$ or $b_k b_{k+1} \ldots b_{k+d}$. Further, the random binary sequence generation unit 120 or 220 outputs the updated random binary sequence $b_0 b_1 \ldots b_{m-1}$ or $b_0 b_1 \ldots b_{k-1}$ to the integer conversion unit 140 or 240, and step S310 is re-performed where the integer conversion unit 140 or 240 converts the updated random binary sequence $b_0 b_1 \ldots b_{m-1}$ or $b_0 b_1 \ldots b_{k-1}$ into an integer 't' or 'a'.

In the method of converting a random binary sequence into a random integer according to the present invention, steps S310, S320, and S340 are repeatedly performed until it is determined, at step S320 that the integer 't' or 'a' converted from the random binary sequence $b_0 b_1 \ldots b_{m-1}$ or $b_0 b_1 \ldots b_{k-1}$ falls within the preset integer interval $[0, r-1]$ or $[0, r^n-1]$.

Figure 4:
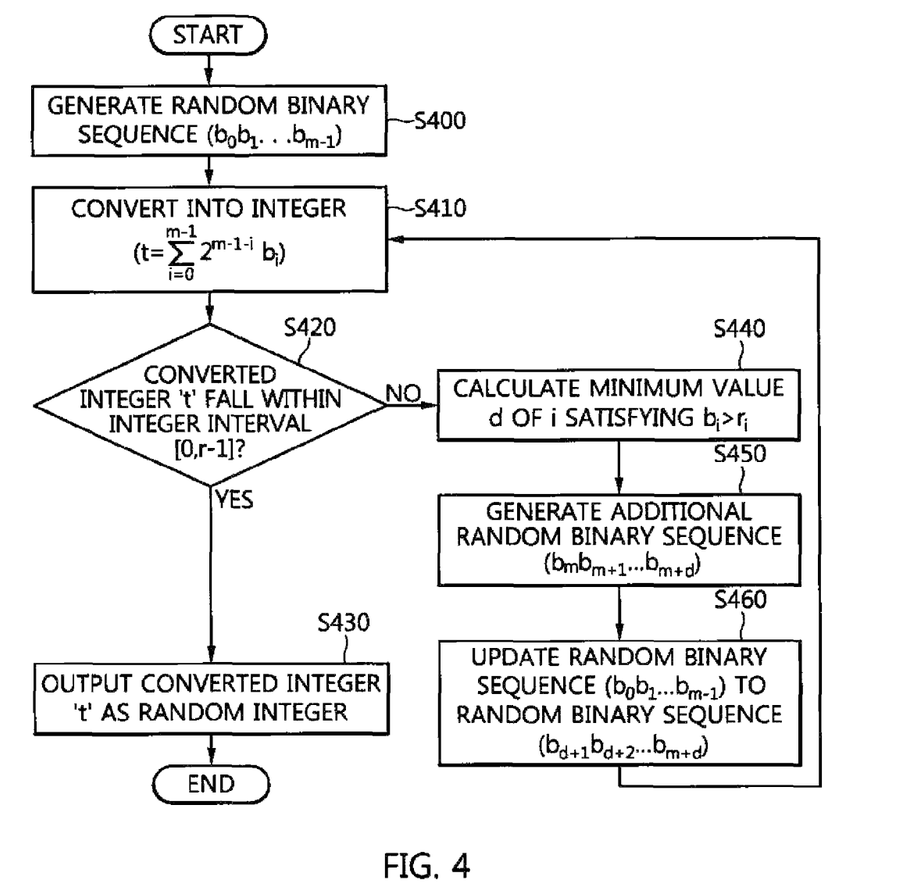
FIG. 4 is a flowchart showing a method of converting a random binary sequence into a random integer depending on a Simple PMD (SPDM)

FIG. 4 is a flowchart showing in detail a method of outputting a random integer depending on an SPDM for converting a random binary sequence into a single random integer in the method of converting a random binary sequence into a random integer according to the present invention.

Referring to FIG. 4, in the method of converting a random binary sequence into a random integer depending on the SPDM in accordance with the present invention, the random binary sequence generation unit 120 generates a random binary sequence $b_0 b_1 \ldots b_{m-1}$ having m bits corresponding to the minimum number of bits required to represent r−1 by a binary number in the integer interval $[0, r-1]$ at step S400. Further, the random binary sequence generation unit 120 outputs the generated random binary sequence $b_0 b_1 \ldots b_{m-1}$ to the integer conversion unit 140.

Then, the integer conversion unit 140 converts the random binary sequence $b_0 b_1 \ldots b_{m-1}$ received from the random binary sequence generation unit 120 into an integer 't' based on Equation (3) at step S410. Further, the integer conversion unit 140 outputs the integer 't' converted, from the random binary sequence $b_0 b_1 \ldots b_{m-1}$ to the random integer output unit 160.

Next, the random integer output unit 160 determines whether the integer 't' received from the integer conversion unit 140 falls within an integer interval $[0, r-1]$ at step S420.

If it is determined at step S420 that the integer 't' received from the integer conversion unit 140 falls within the integer interval $[0, r-1]$ (when $0 \le t \le r-1$), the random integer output unit 160 outputs the integer 't' as a random integer at step S430.

In contrast, if it is determined at step S420 that the integer 't' received from the integer conversion unit 140 does not fall within the integer interval $[0, r-1]$ (when $t > r-1$), d corresponding to the minimum value of i satisfying $b_i > r_i$ is calculated at step S440. In this case, the random integer output unit 160 calculates d satisfying Equation (4).

Then, the random integer output unit 160 requests the random binary sequence generation unit 120 to update the random binary sequence $b_0 b_1 \ldots b_{m-1}$, and the random binary sequence generation unit 120 generates an additional random binary sequence $b_m b_{m+1} \ldots b_{m+d}$ having d+1 bits at the request of the random integer output unit 160 at step S450.

Further, the random binary sequence generation unit 120 updates the random binary sequence $b_0 b_1 \ldots b_{m-1}$ to the random binary sequence $b_{d+1} b_{d+2} \ldots b_{m+d}$ calculated based on the random binary sequence $b_0 b_1 \ldots b_{m-1}$ and the additional random binary sequence $b_m b_{m+1} \ldots b_{m+d}$ at step S460. In this case, the random binary sequence generation unit 120 outputs the updated random binary sequence $b_0 b_1 \ldots b_{m-1}$ to the integer conversion unit 140, and the integer conversion unit 140 re-performs the operation of converting the updated random binary sequence $b_0 b_1 \ldots b_{m-1}$ into an integer 't' at step S410.

Meanwhile, steps S410, S420, and S440 to S460 are repeatedly performed until it is determined at step S420 that the integer 't' converted from the updated random binary sequence $b_0 b_1 \ldots b_{m-1}$ falls within the integer interval $[0, r-1]$.

Figure 5:
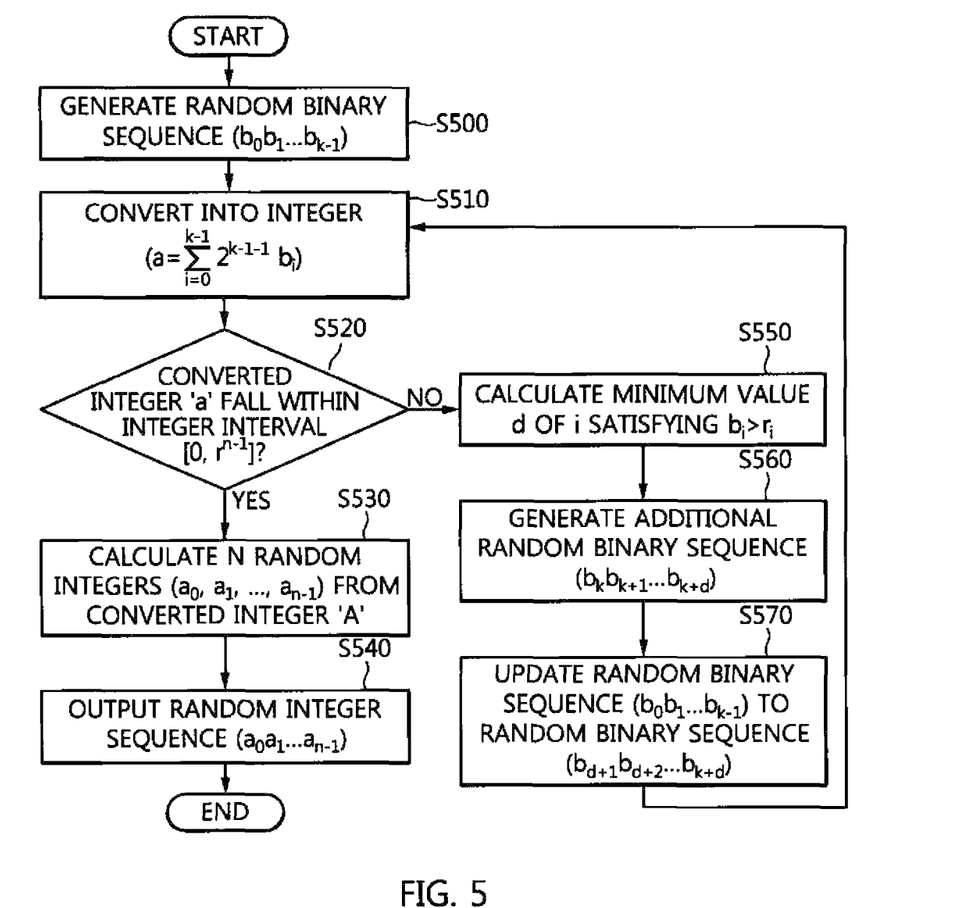
FIG. 5 is a flowchart showing a method of converting a random binary sequence into a random integer sequence depending on a Complex PDM (CPDM).

FIG. 5 is a flowchart showing in detail a method of outputting a random integer sequence depending on a CPDM for converting a random binary sequence into a random integer sequence composed of a plurality of random integers in the method of converting a random binary sequence into a random integer according to the present invention.

Referring to FIG. 5, in the method of converting a random binary sequence into a random integer sequence depending on the CPDM in accordance with the present invention, the random binary sequence generation unit 220 generates a random binary sequence $b_0 b_1 \ldots b_{k-1}$ having k bits corresponding to the minimum number of bits required to represent $r^n-1$ by a binary number in an integer interval $[0, r^n-1]$ at step S500. Further, the random binary sequence generation unit 220 outputs the generated random binary sequence $b_0b_1 \ldots b_{k-1}$ to the integer conversion unit 240.

Then, the integer conversion unit 240 converts the random binary sequence $b_0b_1 \ldots b_{k-1}$ received from the random binary sequence generation unit 220 into an integer 'a' based on Equation (7) at step S510. Further, the integer conversion unit 240 outputs the integer 'a' converted from the random binary sequence $b_0b_1 \ldots b_{k-1}$ to the random integer sequence output unit 260.

Thereafter, the random integer sequence output unit 260 determines whether the integer 'a' received from the integer conversion unit 240 falls within the integer interval $[0, r^n-1]$ at step S520.

If it is determined at step S520 that the integer 'a' received from the integer conversion unit 240 falls within the integer interval $[0, r^n-1]$ (when $0 \leq a \leq r^n-1$), the random integer sequence output unit 260 calculates n random integers $a_0, \ldots, a_{n-1}$ from the integer 'a' based on Equation (8) at step S530. Further, the random integer sequence output unit 260 outputs an integer sequence $a_0a_1 \ldots a_{n-1}$ in which the n integers $a_0, \ldots, a_{n-1}$ are sequentially combined as a random integer sequence at step S540.

Meanwhile, if it is determined at step S520 that the integer 'a' received from the integer conversion unit 240 does not fall within the integer interval $[0, r^n-1]$ (when $a > r^n-1$), d corresponding to the minimum value of i satisfying $b_i > r_i$ is calculated at step S550. In this case, the random integer sequence output unit 260 calculates d satisfying Equation (9).

Thereafter, the random integer sequence output unit 260 requests the random binary sequence generation unit 220 to update the random binary sequence $b_0b_1 \ldots b_{k-1}$, and the random binary sequence generation unit 220 generates an additional random binary sequence $b_kb_{k+1} \ldots b_{k+d}$ having $d+1$ bits at the update request of the random integer sequence output unit 260 at step S560.

Further, the random binary sequence generation unit 220 updates the random binary sequence $b_0b_1 \ldots b_{k-1}$ to the random binary sequence $b_{d+1}b_{d+2} \ldots b_{k+d}$ calculated based on the random binary sequence $b_0b_1 \ldots b_{k-1}$ and the additional random binary sequence $b_kb_{k+1} \ldots b_{k+d}$ at step S570. In this case, the random binary sequence generation unit 220 outputs the updated random binary sequence $b_0b_1 \ldots b_{k-1}$ to the integer conversion unit 240, and the integer conversion unit 240 re-performs the operation of converting the updated random binary sequence $b_0b_1 \ldots b_{k-1}$ into an integer 'a' at step S510.

Meanwhile, steps S510, S520, and S550 to S570 are repeatedly performed until it is determined at step S520 that the integer 'a' converted from the updated random binary sequence $b_0b_1 \ldots b_{k-1}$ falls within the integer interval $[0, r^n-1]$.

The steps of the method of converting a random binary sequence into a random integer depending on the SPDM or CPDM of the present invention may be implemented as computer-readable code in a computer-readable storage medium. The computer-readable storage medium includes all types of storage devices for storing data readable by a computer system. Examples of the computer-readable storage medium include Read Only Memory (ROM), Random Access Memory (RAM), Compact Disc ROM (CD-ROM), Compact Disk-Rewritable (CD-RW), magnetic tape, a floppy disc, a Hard Disk Drive (HDD), an optical disk, and a magneto-optical storage device, etc, and also include the form of carrier waves (for example, transmission over the Internet). Furthermore, the computer-readable storage medium can be distributed to computer systems connected over a network and computer-readable code can be stored and executed in a distributed manner.

In accordance with the present invention, there is an advantage in that when an integer converted from a random binary sequence does not fall within a preset interval, the number of bits that are discarded is less than the number of bits that are selected to generate the integer.

Further, in accordance with the present invention, there is an advantage in that, compared to conventional SPDM and CPDM which discard all selected bits when an integer converted from a random binary sequence does not fall within a preset integer interval, the number of bits required to output the same number of integers can be reduced, thus improving efficiency.

Furthermore, in accordance with the present invention, there is an advantage in that the number of operations of a random number generator for generating a random binary sequence is reduced, thus entirely improving the efficiency of systems that use the random number generator.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Accordingly, those skilled in the art will appreciate that various modifications and other equivalent embodiments are possible from the embodiments. Therefore, the technical scope of the present invention should be defined by the technical spirit of the claims.

What is claimed is:

1. An apparatus for converting a random binary sequence into a random integer, comprising:
    at least one micro-processor and a storage;
    a random binary sequence generator that is loaded on the at least one-micro-processor and generates a random binary sequence $(b_0b_1 \ldots b_{m-1})$ having m bits corresponding to a minimum number of bits required to represent r−1 by a binary number in an integer interval [0, r−1], where r is an integer greater than 1;
    an integer converter that is loaded on the at least one micro-processor and converts the random binary sequence $(b_0b_1 \ldots b_{m-1})$ into an integer; and
    a random integer output device that is loaded on the at least one micro-processor, determines whether the integer converted from the random binary sequence $(b_0b_1 \ldots b_{m-1})$ falls within the integer interval [0, r−1], and, if it is determined that the integer converted from the random binary sequence $(b_0b_1 \ldots b_{m-1})$ does not fall within the integer interval [0, r−1], requests the random binary sequence generator to update the random binary sequence $(b_0b_1 \ldots b_{m-1})$, and, if it is determined that the integer converted from the random binary sequence $(b_0b_1 \ldots b_{m-1})$ falls within the integer interval [0, r−1], outputs the integer converted from the random binary sequence $(b_0b_1 \ldots b_{m-1})$ as a random integer,
    wherein the random binary sequence generator generates an additional random binary sequence at an update request of the random integer output device, and updates the random binary sequence $(b_0b_1 \ldots b_{m-1})$ to a random binary sequence calculated by combining the generated additional random binary sequence with the random binary sequence $(b_0b_1 \ldots b_{m-1})$.

2. The apparatus of claim 1, wherein the random binary sequence generator calculates d that is a minimum value of i satisfying $b_i > r_i$ and generates an additional random binary sequence ($b_m b_{m+1} \ldots b_{m+d}$) having d+1 bits at the update request of the random integer output device, and updates the random binary sequence ($b_0 b_1 \ldots b_{m-1}$) to a random binary sequence ($b_{d+1} b_{d+2} \ldots b_{m+d}$) calculated based on the random binary sequence ($b_0 b_1 \ldots b_{m-1}$) and the additional random binary sequence ($b_0 b_{m+1} \ldots b_{m+d}$), where $b_i$ denotes an ith bit value of the random binary sequence ($b_0 b_1 \ldots b_{m-1}$), and $r_i$ denotes an ith bit value when r−1 is represented by a binary sequence ($r_0 r_1 \ldots r_{m-1}$) having m bits.

3. The apparatus of claim 2, wherein:
the integer converter converts the random binary sequence ($b_0 b_1 \ldots b_{m-1}$) updated to the random binary sequence ($b_{d+1} b_{d+2} \ldots b_{m+d}$) into an integer, and
the random integer output device determines whether the integer converted from the updated random binary sequence ($b_0 b_1 \ldots b_{m-1}$) falls within the integer interval [0, r−1], and if it is determined that the integer converted from the updated random binary sequence ($b_0 b_1 \ldots b_{m-1}$) falls within the integer interval [0, r−1], outputs the integer converted from the updated random binary sequence ($b_0 b_1 \ldots b_{m-1}$) as a random integer.

4. An apparatus for converting a random binary sequence into a random integer sequence, comprising:
at least one micro-processor and a storage;
a random binary sequence generator that is loaded on the at least one micro-processor and generates a random binary sequence ($b_0 b_1 \ldots b_{k-1}$) having k bits corresponding to a minimum number of bits required to represent $r^n-1$ by a binary number in an integer interval [0, $r^n-1$], where r is an integer greater than 1;
an integer converter that is loaded on the at least one micro-processor and converts the random binary sequence ($b_0 b_1 \ldots b_{k-1}$) into an integer 'a'; and
a random integer sequence output device that is loaded on the at least one micro-processor, determines whether the integer 'a' converted from the random binary sequence ($b_0 b_1 \ldots b_{k-1}$) falls within the integer interval [0, $r^n-1$], and, if it is determined that the integer converted from the random binary sequence ($b_0 b_1 \ldots b_{k-1}$) does not fall within the integer interval [0, $r^n-1$], requests the random binary sequence generation unit to update the random binary sequence ($b_0 b_1 \ldots b_{k-1}$), and, if it is determined that the integer converted from the random binary sequence ($b_0 b_1 \ldots b_{k-1}$) falls within the integer interval [0, $r^n-1$], outputs a random integer sequence ($a_0 a_1 \ldots a_{n-1}$) composed of n random integers ($a_0, \ldots, a_{n-1}$) calculated based on equation $a=\sum_{i=0}^{n-1} r^{n-1-i} a_i$; for the integer 'a' converted from the random binary sequence ($b_0 b_1 \ldots b_{k-1}$),
wherein the random binary sequence generator generates an additional random binary sequence at an update request of the random integer sequence output device, and updates the random binary sequence ($b_0 b_1 \ldots b_{k-1}$) to a random binary sequence calculated by combining the generated additional random binary sequence with the random binary sequence ($b_0 b_1 \ldots b_{k-1}$).

5. The apparatus of claim 4, wherein the random binary sequence generator calculates d that is a minimum value of i satisfying $b_i > r_i$ and generates an additional random binary sequence ($b_k b_{k+1} \ldots b_{k+d}$) having d+1 bits at the update request of the random integer sequence output device, and updates the random binary sequence ($b_0 b_1 \ldots b_{k-1}$) to a random binary sequence ($b_{d+1} b_{d+2} \ldots b_{k+d}$) calculated based on the random binary sequence ($b_0 b_1 \ldots b_{k-1}$) and the additional random binary sequence ($b_k b_{k+1} \ldots b_{k+d}$), where $b_i$ denotes an ith bit value of the random binary sequence ($b_0 b_1 \ldots b_{k-1}$) and $r_i$ denotes an ith bit value when $r^n-1$ is represented by a binary sequence ($r_0 r_1 \ldots r_{k-1}$) having k bits.

6. The apparatus of claim 5, wherein:
the integer converter converts the random binary sequence ($b_0 b_1 \ldots b_{k-1}$) updated to the random binary sequence ($b_{d+1} b_{d+2} \ldots b_{k+d}$) into the integer 'a', and
the random integer sequence output device unit determines whether the integer 'a' converted from the updated random binary sequence ($b_0 b_1 \ldots b_{k-1}$) falls within the integer interval [0, $r^n-1$], and if it is determined that the integer 'a' converted from the updated random binary sequence ($b_0 b_1 \ldots b_{k-1}$) falls within the integer interval [0, $r^n-1$], outputs the random integer sequence ($a_0 a_1 \ldots a_{n-1}$) composed of n random integers ($a_0, \ldots, a_{n-1}$) calculated based on equation $a=\sum_{i=0}^{n-1} r^{n-1-i} a_i$ for the integer 'a' converted from the updated random binary sequence ($b_0 b_1 \ldots b_{k-1}$).

7. A method of converting a random binary sequence into a random integer, the method executed by at least one micro-processor and comprising:
a) generating a random binary sequence by a random binary sequence generator loaded on the at least one micro-processor;
b) converting the random binary sequence into an integer by an integer converter loaded on the at least one micro-processor;
c) determining by a random integer output device loaded on the at least one micro-processor whether the integer converted from the random binary sequence falls within a preset integer interval;
d) if it is determined that the integer converted from the random binary sequence falls within the preset integer interval, outputting, by the random integer output device, a random integer or a random integer sequence calculated based on the integer converted from the random binary sequence; and
e) if it is determined that the integer converted from the random binary sequence does not fall within the preset integer interval, generating, by the random binary sequence generator, an additional random binary sequence, updating the random binary sequence to a random binary sequence calculated by combining the generated additional random binary sequence with the random binary sequence, and repeatedly performing b) to d).

8. The method of claim 7, wherein a) of generating the random binary sequence is configured to generate a random binary sequence ($b_0 b_1 \ldots b_{m-1}$) having m bits corresponding to a minimum number of bits required to represent r−1 by a binary number in an integer interval [0, r−1], where r is an integer greater than 1.

9. The method of claim 8, wherein b) of converting the random binary sequence into the integer is configured to convert the random binary sequence ($b_0 b_1 \ldots b_{m-1}$) into an integer.

10. The method of claim 9, wherein c) of determining whether the integer converted from the random binary sequence falls within the preset integer interval is configured to determine whether the integer converted from the random binary sequence ($b_0 b_1 \ldots b_{m-1}$) falls within the integer interval [0, r−1].

11. The method of claim 10, wherein d) of outputting the random integer or the random integer sequence calculated based on the integer converted from the random binary sequence is configured to, if the integer converted from the random binary sequence ($b_0 b_1 \ldots b_{m-1}$) falls within the integer interval [0, r−1], output the integer converted from the random binary sequence ($b_0 b_1 \ldots b_{m-1}$) as a random integer.

12. The method of claim 11, wherein e) of updating the random binary sequence and repeatedly performing b) to d) is configured to, if the integer converted from the random binary sequence ($b_0 b_1 \ldots b_{m-1}$) does not fall within the integer interval [0, r−1], calculate d that is a minimum value of i satisfying $b_i > r_i$, generate an additional random binary sequence ($b_m b_{m+1} \ldots b_{m+d}$) having d+1 bits, update the random binary sequence ($b_0 b_1 \ldots b_{m-1}$) to a random binary sequence ($b_{d+1} b_{d+2} \ldots b_{m+d}$) calculated based on the random binary sequence ($b_0 b_1 \ldots b_{m-1}$) and the additional random binary sequence ($b_m b_{m+1} \ldots b_{m+d}$), and repeatedly perform b) to d), where $b_i$ denotes an ith bit value of the random binary sequence ($b_0 b_1 \ldots b_{m-1}$) and $r_i$ denotes an ith bit value when r−1 is represented by a binary sequence ($r_0 r_1 \ldots r_{m-1}$) having m bits.

13. The method of claim 12, wherein e) of updating the random binary sequence and repeatedly performing b) to d) is configured to repeatedly perform b) to d) until the integer converted from the random binary sequence ($b_0 b_1 \ldots b_{m-1}$) updated to the random binary sequence ($b_{d+1} b_{d+2} \ldots b_{m+d}$) falls within the integer interval [0, r−1].

14. The method of claim 7, wherein a) of generating the random binary sequence is configured to generate a random binary sequence ($b_0 b_1 \ldots b_{k-1}$) having k bits corresponding to a minimum number of bits required to represent $r^n - 1$ by a binary number in an integer interval [0, $r^n - 1$], where r is an integer greater than 1.

15. The method of claim 14, wherein b) of converting the random binary sequence into the integer is configured to convert the random binary sequence ($b_0 b_1 \ldots b_{k-1}$) into an integer 'a'.

16. The method of claim 15, wherein c) of determining whether the integer converted from the random binary sequence falls within the preset integer interval is configured to determine whether the integer 'a' converted from the random binary sequence ($b_0 b_1 \ldots b_{k-1}$) falls within the integer interval [0, $r^n - 1$].

17. The method of claim 16, wherein d) of outputting the random integer or the random integer sequence calculated based on the integer converted from the random binary sequence is configured to, if the integer 'a' converted from the random binary sequence ($b_0 b_1 \ldots b_{k-1}$) falls within the integer interval [0, $r^n - 1$], output a random integer sequence ($a_0 a_1 \ldots a_{n-1}$) composed of n random integers ($a_0, a_1, \ldots, a_{n-1}$) calculated based on equation $a = \Sigma_{i=0}^{n-1} r^{n-1-i} a_i$ for the integer 'a' converted from the random binary sequence ($b_0 b_1 \ldots b_{k-1}$).

18. The method of claim 17, wherein e) of updating the random binary sequence and repeatedly performing b) to d) is configured to, if it is determined that the integer converted from the random binary sequence ($b_0 b_1 \ldots b_{k-1}$) does not fall within the integer interval [0, $r^n - 1$], calculate d that is a minimum value of i satisfying $b_i > r_i$, generate an additional random binary sequence ($b_k b_{k+1} \ldots b_{k+d}$) having d+1 bits, update the random binary sequence ($b_0 b_1 \ldots b_{k-1}$) to a random binary sequence ($b_{d+1} b_{d+2} \ldots b_{k+d}$) calculated based on the random binary sequence ($b_0 b_1 \ldots b_{k-1}$) and the additional random binary sequence ($b_k b_{k+1} \ldots b_{k+d}$), and repeatedly perform b) to d), where $b_i$ denotes an ith bit value of the random binary sequence ($b_0 b_1 \ldots b_{k-1}$) and $r_i$ denotes an ith bit value when $r^n - 1$ is represented by a binary sequence ($r_0 r_1 \ldots r_{k-1}$) having k bits.

19. The method of claim 18, wherein e) of updating the random binary sequence and repeatedly performing b) to d) is configured to repeatedly perform b) to d) until the integer 'a' converted from the random binary sequence ($b_0 b_1 \ldots b_{k-1}$) updated to the random binary sequence ($b_{d+1} b_{d+2} \ldots b_{k+d}$) falls within the integer interval [0, $r^n - 1$].

* * * * *